(12) United States Patent
Aruga

(10) Patent No.: US 6,833,900 B2
(45) Date of Patent: Dec. 21, 2004

(54) ELECTRO-OPTICAL DEVICE AND ELECTRONIC APPARATUS

(75) Inventor: Yasuhito Aruga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 10/067,842

(22) Filed: Feb. 8, 2002

(65) Prior Publication Data

US 2002/0135293 A1 Sep. 26, 2002

(30) Foreign Application Priority Data

Feb. 16, 2001 (JP) ........................................ 2001-040697

(51) Int. Cl.$^7$ ............................................. G02F 1/1345
(52) U.S. Cl. ........................................ 349/149; 349/152
(58) Field of Search .............................. 349/152, 151, 349/149

(56) References Cited

U.S. PATENT DOCUMENTS

| | | | | |
|---|---|---|---|---|
| 5,187,604 A | * | 2/1993 | Taniguchi et al. | ........... 349/152 |
| 5,608,559 A | * | 3/1997 | Inada et al. | ................... 349/149 |
| 5,636,329 A | * | 6/1997 | Sukegawa et al. | .......... 349/149 |
| 6,346,976 B1 | * | 2/2002 | Komeno et al. | ............ 349/139 |
| 6,480,255 B2 | * | 11/2002 | Hoshino et al. | ............ 349/149 |
| 6,628,364 B2 | * | 9/2003 | Yeo et al. | .................... 349/151 |
| 6,630,688 B2 | * | 10/2003 | Kong et al. | ................... 257/72 |
| 6,667,778 B1 | * | 12/2003 | Ono et al. | ..................... 349/43 |
| 6,690,442 B1 | * | 2/2004 | Kohtaka et al. | ............ 349/139 |
| 6,700,636 B2 | * | 3/2004 | Kim et al. | ................... 349/139 |
| 2002/0132385 A1 | * | 9/2002 | Dojo et al. | ................... 438/30 |

FOREIGN PATENT DOCUMENTS

| | | | | |
|---|---|---|---|---|
| JP | 06289415 A | * | 10/1994 | ......... G02F/1/1345 |
| JP | 11-133452 | | 5/1999 | |
| JP | 2000194013 A | * | 7/2000 | ........... G02F/1/136 |

* cited by examiner

Primary Examiner—Kenneth Parker
(74) Attorney, Agent, or Firm—Oliff & Berridge, PLC

(57) ABSTRACT

In a liquid crystal display that includes a second substrate that supports a liquid crystal and data lines formed on the surface of the second substrate, a third insulating layer that covers the data lines is formed on the surface of the second substrate. On the surface of the third insulating layer, chip connecting wiring is formed over a covered region covered with a sealing material and the liquid crystal and the region other than the covered region. By connecting the chip connecting wiring to the data lines via contact holes formed within the covered region of the third insulating layer, corrosion of the wiring formed on the substrate is inhibited.

11 Claims, 8 Drawing Sheets

(a)

(b)

ELECTRO-OPTICAL DEVICE AND ELECTRONIC APPARATUS

TECHNICAL FIELD OF THE INVENTION

The present invention relates to an electro-optical device and an electronic apparatus which use an electro-optical material such as liquid crystal and an electroluminescent (EL) material.

DESCRIPTION OF THE RELATED ART

As is generally known, electro-optical devices are widely used as display units for electronic apparatuses. Typical examples of such display units are liquid crystal displays and electroluminescent (EL) displays. Such an electro-optical device generally comprises a substrate for carrying an electro-optical material, such as liquid crystal and an electroluminescent element, and electrodes for applying a voltage to the electro-optical material. For this type of electro-optical device, a structure has been suggested in which wiring for supplying signals to the electrodes is provided and extended toward the edges of the substrate while being connected to an IC chip which is mounted on the substrate by the chip-on-glass (COG) method.

SUMMARY OF THE INVENTION

The above-described structure, however, has a problem in that the wiring extending toward the edges of the substrate are exposed to outside air and thus the exposed portions easily suffer from corrosion caused by deposition of water or the like. From the viewpoint of wiring resistance and the like, the wiring are preferably composed of a metal such as aluminum; however, since such a metal is vulnerable to corrosion, the above problem is more noticeable.

The present invention has been made in view of the above circumstances and aims to provide an electro-optical device and an electronic apparatus which suffer less from corrosion of the wiring formed on the substrate.

To overcome this problem, an electro-optical device of the present invention comprises: a substrate carrying an electro-optical material; a first wiring formed on the surface of the substrate; an insulating layer for covering the first wiring, the insulating layer being formed on the surface of the substrate; and a second wiring formed over a first region of the insulating layer including a region overlapping a region in which the electro-optical material is formed and a second region which corresponds to the remaining region other than the first region of the insulating layer, the second wiring being connected to the first wiring via a contact hole formed within the first region of the insulating layer.

With this structure, since the first wiring is covered with the insulating layer, corrosion of the first wiring due to deposition of moisture or the like can be prevented. Moreover, since a contact hole for connecting the first wiring to the second wiring is formed in the first region including the region overlapping the region in which the electro-optical material is formed, moisture can be prevented from reaching the vicinity of the contact hole. Accordingly, when, for example, the second wiring is made of a material which readily permeates moisture, the moisture does not permeate through the second wiring and reach the first wiring. Thus, corrosion of the first wiring can be reliably prevented.

When the above electro-optical device is applied to a liquid crystal display using liquid crystal as the electro-optical material, the electro-optical device includes a counter substrate for holding the electro-optical material between the substrate and the counter substrate and a sealing material disposed between the substrate and the counter substrate. In such a case, the first region preferably includes a region of the insulating layer facing the sealing material. That is, when the contact hole is formed in the region of the insulating layer overlaid with the sealing material, moisture can be prevented from reaching the vicinity of the contact holes, and corrosion of the first wiring can be reliably suppressed.

Furthermore, in order to overcome the above problem, an electro-optical device of the present invention comprises: a substrate carrying an electro-optical material; a first wiring formed on the surface of the substrate; an insulating layer for covering the first wiring, the insulating layer being formed on the surface of the substrate and having a mounting region overlaid with an electronic component mounted on the surface of the insulating layer; and a second wiring connected to the electronic component, the second wiring being formed on the surface of the insulating layer and connected to the first wiring via a contact hole formed within the mounting region.

According to this electro-optical device, as in the above, the first wiring is covered with the insulating layer to prevent corrosion of the first wiring. In addition, since contact holes for connecting the first wiring to the second wiring are provided in the region for mounting the electronic component, moisture can be prevented from reaching the vicinity of the contact hole. Accordingly, when, for example, the second wiring is made of material which readily permeates moisture, the moisture can be reliably prevented from reaching the first wiring, thereby securely preventing corrosion of the first wiring. An example of the electro-optical device is an integrated circuit having an output terminal connected to the second wiring. An example of the electronic component is a flexible substrate comprising a base having flexibility and a wiring formed on the surface of the base, the wiring being connected to the second wiring.

In the electro-optical device of the present invention, the first wiring is preferably made of an elemental metal or an alloy whereas the second wiring is preferably made of a conductive oxide. In this manner, the second wiring has a higher corrosion resistance than the first wiring; hence, the problem of wiring corrosion can be overcome even when a structure including a second wiring exposed outside is employed.

In an electro-optical device further comprising a pixel electrode for applying a voltage to the electro-optical material, the second wiring and the pixel electrode are preferably formed of the same layer. In this manner, the pixel electrode and the second wiring can be made in the same step, thereby reducing the manufacturing cost. Note that in this case, both the pixel electrode and the second wiring may be made of indium tin oxide (ITO).

To overcome the above problem, an electronic apparatus of the present invention comprises the electro-optical device described above. As is described above, in the electro-optical device of the present invention, corrosion of the wiring formed on the substrate can be prevented. Thus, the electronic apparatus using this electro-optical device is free from degradation of the display quality caused by the corrosion of the wiring of the electro-optical device.

DESCRIPTION OF REFERENCE NUMERALS

1: liquid crystal display (electro-optical device), 10: first substrate (counter substrate), 11: counter electrode, 20: second substrate (substrate), 201: projection (second region), 21: scanning line, 22: data line (first wiring), 23: pixel electrode, 24: TFT, 246: third insulating layer (insulating layer), 25: chip connecting wiring 25 (second wiring), 25a: contact hole, 30: sealing material, 40: liquid crystal (electro-optical material), 51: X driver IC (electronic component), 52: Y driver IC, 61: covered region (first region), 62: mounting region, 81: personal computer (electronic apparatus), and 82: cellular phone (electronic apparatus).

BEST MODE FOR CARRYING OUT THE INVENTION

The preferred embodiments of the present invention will now be described with reference to the drawings. Each of the embodiments below represents an aspect of the present invention and by no means limits the scope of the invention. Various modifications are possible without departing from the technical scope of the present invention. In each of the drawings referenced below, layers and components are illustrated at different scales so as to make each of the layers and components sufficiently identifiable.

<A: First Embodiment>

An active matrix reflective liquid crystal display according to a first embodiment of the present invention will now be described. In this embodiment, a thin film transistor (TFT), which is a three-terminal switching element, is illustrated as a switching element.

Figure 1:
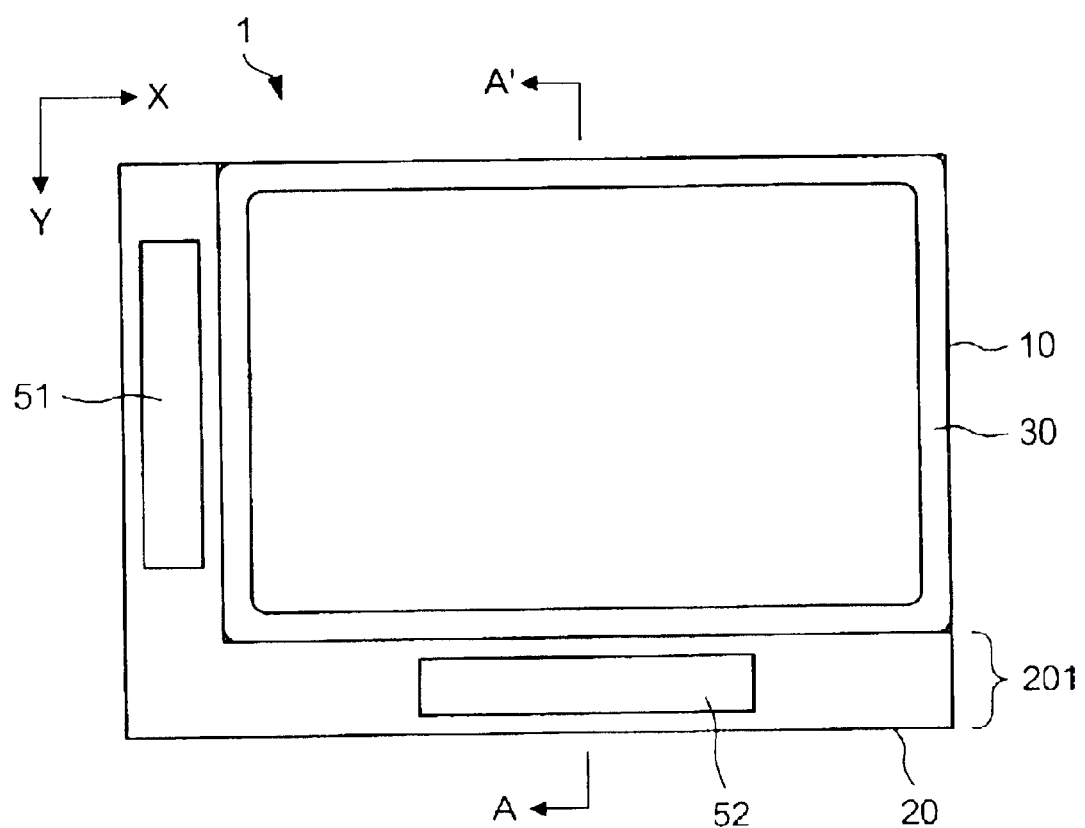
FIG. 1 is a plan view showing the structure of a liquid crystal display according to a first embodiment of the present invention.
Figure 2:
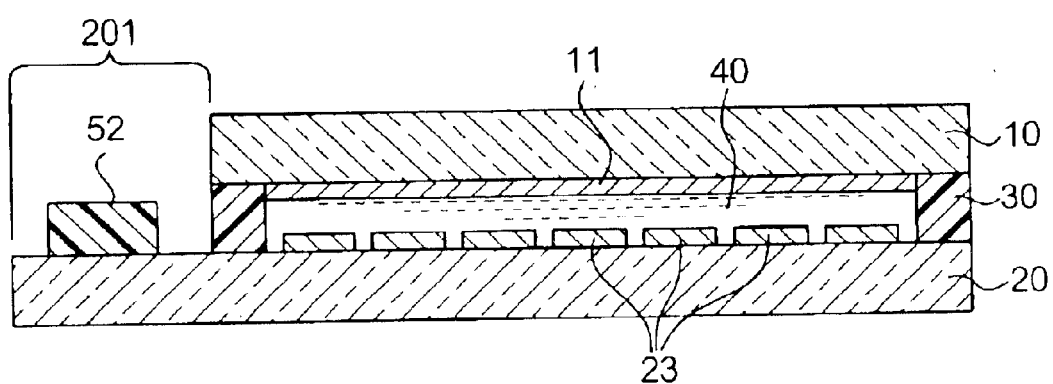
FIG. 2 is a cross-sectional view taken along line A-A' in FIG. 1.

FIG. 1 is a plan view showing the structure of a liquid crystal display according to this embodiment. FIG. 2 is a cross-sectional view taken along line A-A' in FIG. 1. As illustrated in these drawings, a liquid crystal display 1 comprises: a first substrate 10 and a second substrate 20 facing the first substrate 10, which are bonded to each other through a sealing material 30 therebetween; and a liquid crystal 40, i.e., the electro-optical material, enclosed between the two substrates. The sealing material 30 is shaped into a frame having a substantially rectangular form extending along each side of the first substrate 10. The liquid crystal 40 is enclosed in the inner region surrounded by the sealing material 30.

Each of the first substrate 10 and the second substrate 20 is a plate having light transmitting property such as a glass plate, a quartz plate, a plastic plate, or the like. Counter electrodes 11 made of a transparent conductive material such as indium tin oxide (ITO) are formed over the entire inner surface of the first substrate 10 (the side facing the liquid crystal 40). The inner surfaces of the first and second substrates 10 and 20 are covered with alignment layers which are subjected to a rubbing treatment in predetermined directions. A polarizer for polarizing incident light, a retardation film for compensating for interference colors, and the like are bonded on the outer surface of the first substrate 10; however, the description and illustration of these components are omitted since they are not directly related to the present invention.

As shown in FIG. 1, the second substrate 20 includes a section 201 projecting from the outer edges of the sealing material 30 in the negative X axis direction and the positive Y axis direction. This section is hereinafter referred to as the projection 201. In this embodiment, as shown in FIGS. 1 and 2, the edges of the first substrate 10 and the outer edges of the sealing material 30 are aligned and overlaid with each other when viewed in a direction perpendicular to the surface of the first substrate 10. Thus, the projection 201 can also be regarded as a region of the second substrate 20 projecting from the first substrate 10. A Y driver IC 51 and an X driver IC 52 are mounted on the projection 201 by the COG method. The Y driver IC 51 and the X driver IC 52 have circuits that output drive signals, i.e., a scanning signal and a data signal, for driving the liquid crystal 40.

Figure 3:
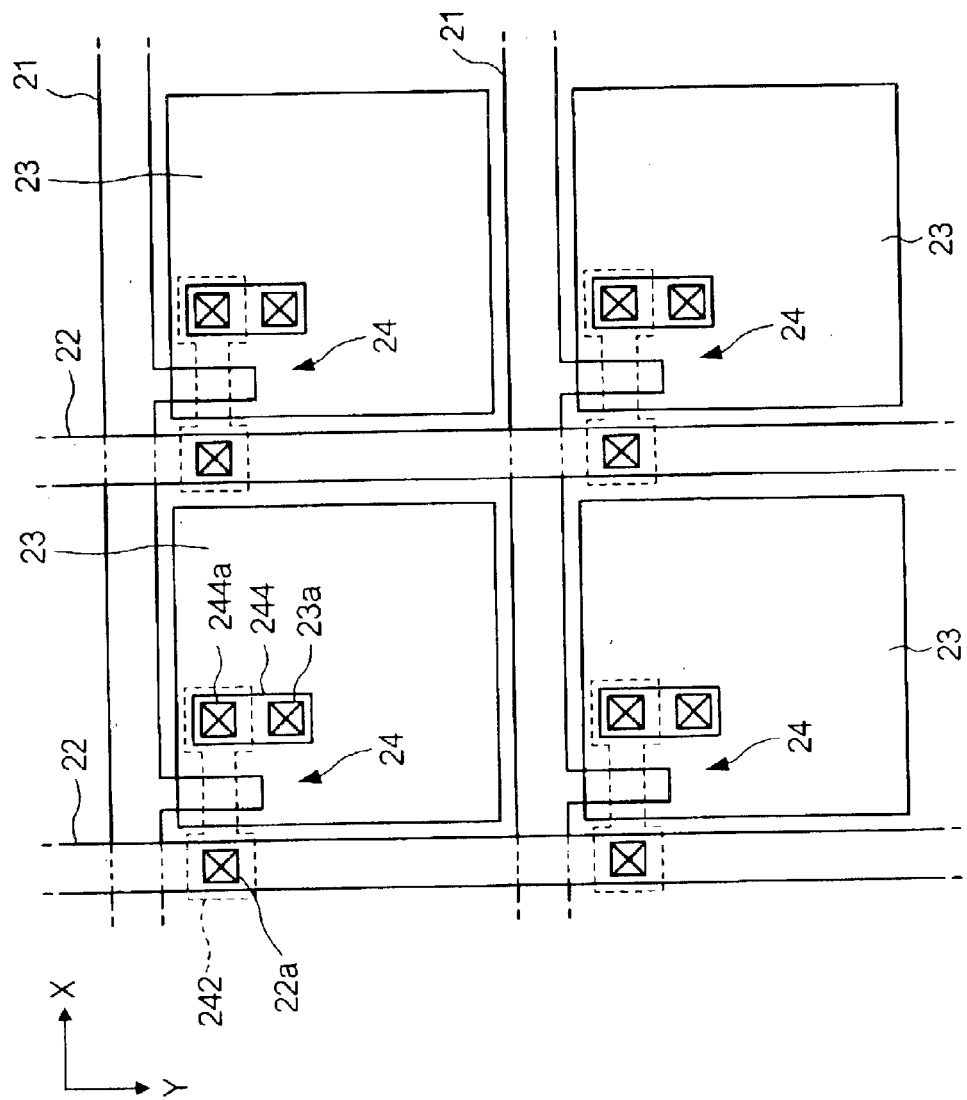
FIG. 3 is a plan view showing the structure of a portion above the second substrate of the liquid crystal display.

As shown in FIG. 3, a plurality of scanning lines 21 extending in the X direction, a plurality of data lines 22 extending in the Y direction, pixel electrodes 23 disposed to correspond to the intersections of the scanning lines 21 and the data lines 22, and thin film transistors (TFTs) 24 are provided on the inner surface of the second substrate 20 (the side facing the liquid crystal 40). Each of the scanning lines 21 crosses one side of the sealing material 30, i.e., the side at the left in FIG. 1, reaches the projection 201, and is connected to the output terminal of the Y driver IC 51 at the end thereof. A scanning signal output from the Y driver IC 51 is thus supplied to each of the scanning lines 21. The pixel electrodes 23 have a substantially rectangular shape and are formed of a transparent conductive material such as ITO. The pixel electrodes 23 are aligned in a matrix on the surface of the second substrate 20 so as to face the counter electrodes 11 on the first substrate 10. The pixel electrodes 23 are connected to the scanning lines 21 and the data lines 22 through TFTs 24, which are three-terminal switching elements. The details are described below.

Figure 4:
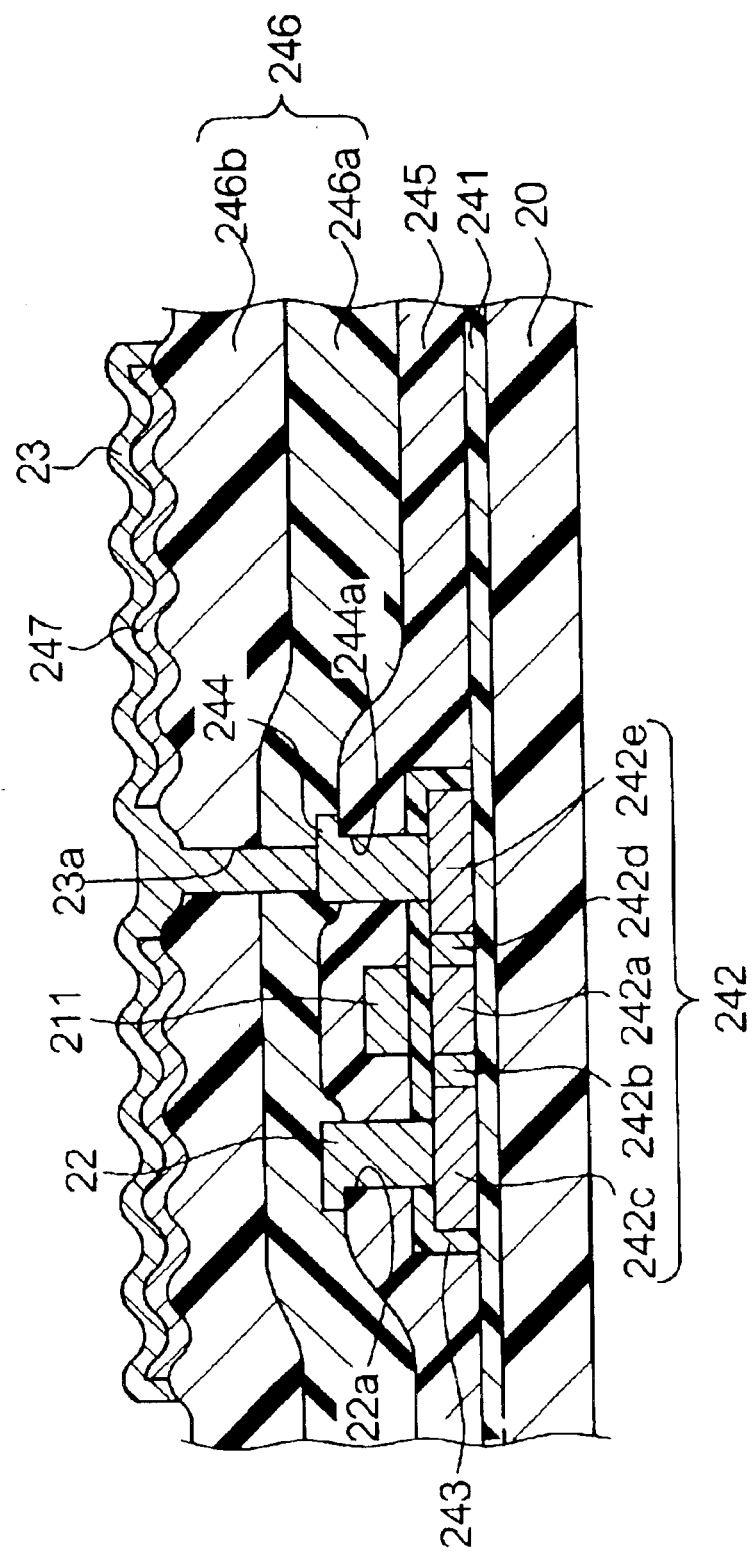
FIG. 4 is a cross-sectional view showing the structure of the vicinity of a TFT in the liquid crystal display.

FIG. 4 is a cross-sectional view showing the structures of the TFT 24 and the vicinity of the TFT 24. As shown in the drawing, a first insulating layer 241 composed of $SiO_2$ or the like is formed on the inner surface of the second substrate 20 as the base layer for forming the TFT 24. A semiconductor layer 242 coated with an insulating film 243 is disposed on the surface of the first insulating layer 241. A region of the semiconductor layer 242 overlaid with the scanning line 21 is defined as a channel region 242a. In other words, as shown in FIG. 3, each scanning line 21 includes a portion extending in the X direction and portions branching from this portion which intersect with the semiconductor layers 242. Each intersection functions as a gate electrode 211 shown in FIG. 4. The surface of the first insulating layer 241 including the semiconductor layer 242 and the gate electrode 211 is covered with a second insulating layer 245 composed of $SiO_2$ or the like.

As shown in FIG. 4, the semiconductor layer 242 includes a lightly doped source region 242b and a heavily doped source region 242c disposed at the source-side of the channel region 242a, and a lightly doped drain region 242d and a heavily doped drain region 242e disposed at the drain-side of the channel region 242a to form what is known as a lightly-doped-drain (LDD) structure. The heavily doped source region 242c is connected to the data line 22, which extends in a direction perpendicular to the plane of the paper of the drawing, via a contact hole 22a penetrating the insulating film 243 on the surface of the semiconductor layer 242 and the second insulating layer 245. In this embodiment, the data line 22 is composed of aluminum. The heavily doped drain region 242e is connected to an intermediate conductive film 244, formed of the same layer as the data line 22, via a contact hole 244a penetrating the insulating film 243 on the surface of the semiconductor layer 242 and the second insulating layer 245.

A third insulating layer 246 covers the surface of the second insulating layer 245 having the data line 22 and the intermediate conductive film 244. The third insulating layer 246 comprises a thin film 246a composed of SiN or the like and a resin layer 246b composed of a resin material, for example, acrylic or epoxy resin. The pixel electrode 23 is formed on the surface of the third insulating layer 246 and is connected to the intermediate conductive film 244 via a contact hole 23a in the third insulating layer 246. In other words, the pixel electrode 23 is connected to the heavily doped drain region 242e of the semiconductor layer 242 via the intermediate conductive film 244.

As shown in FIG. 4, the surface of the third insulating layer 246 on which the pixel electrode 23 is formed is rough and includes numerous microscopic corrugations. A reflector 247 composed of a light-reflective metal such as aluminum or silver is disposed between this rough surface and the pixel electrode 23. Since the reflector 247 is formed as a thin film on the corrugated surface of the third insulating layer 246, the surface of the reflector 247 also has corrugations corresponding to the corrugations on the surface of the third insulating layer 246. As a result, the incident light from the first substrate 10 is adequately scattered by the corrugations formed on the surface of the reflector 247 and is emitted from the first substrate 10 side; accordingly, the images visually observed by an observer are free of background reflection and reflection of light from the room lighting.

Figure 5:
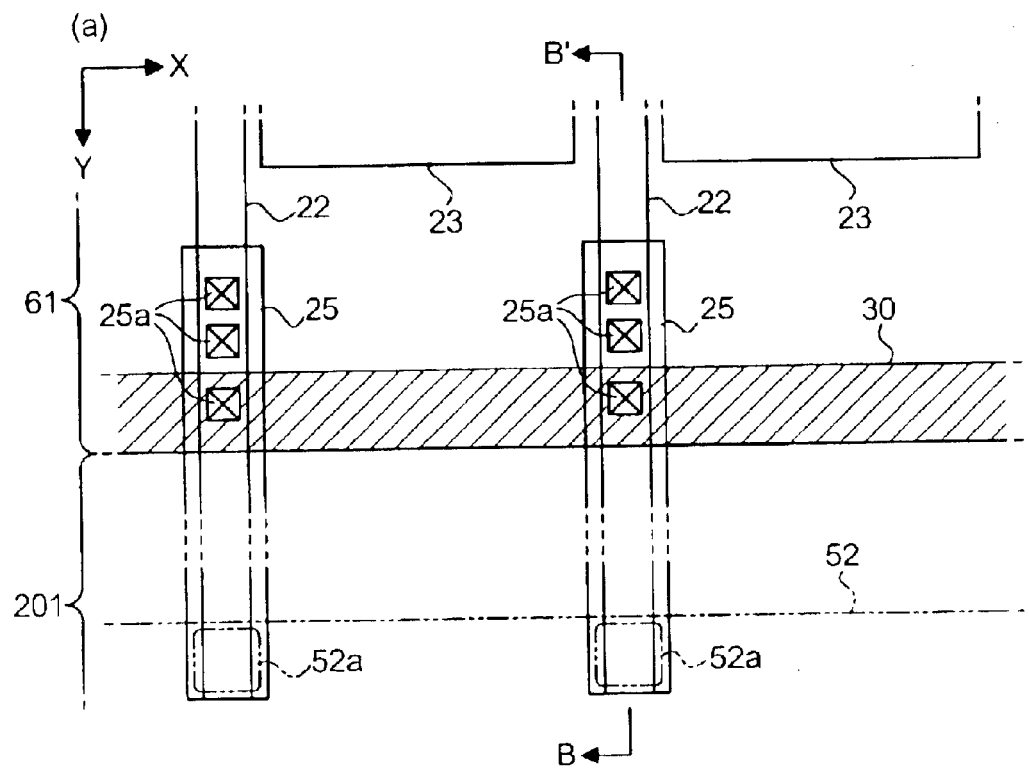
FIG. 5(a) is a plan view showing the structure of the vicinity of a projection in the liquid crystal display, and (b) is a cross-sectional view taken along line B-B' in FIG. 5(a).
Figure 5:
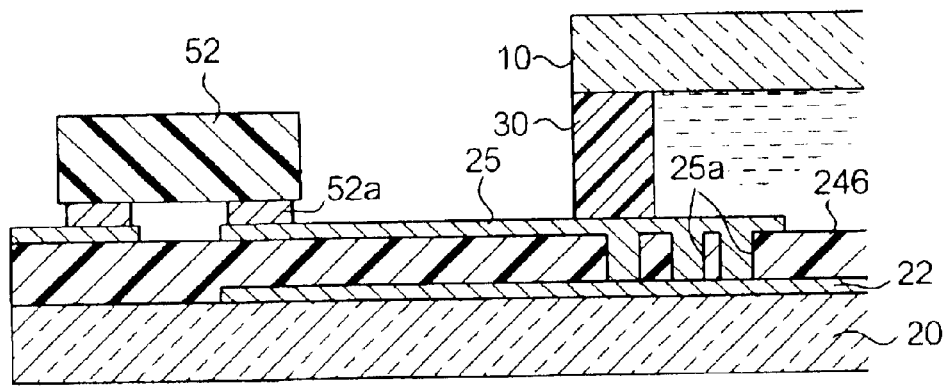

Next, referring to FIGS. 5(a) and (b), the structure of the data line 22 and the structure of the vicinity of the projection 201 are explained. As shown in these drawings, the data line 22 extends from the region surrounded by the sealing material 30, crossing one side of the sealing material 30, i.e., the side at the bottom in FIG. 1, and reaches the projection 201. The data line 22 leading to the projection 201 is covered with the third insulating layer 246, as shown in FIG. 5(b). In other words, while each data line 22 in the inner region of the sealing material 30, i.e., the vicinity of the TFT 24 to be more specific, is coated with the third insulating layer 246, as shown in FIG. 4, each data line 22 in this embodiment is covered with the third insulating layer 246 over the entire length, including the portion extending onto the projection 201. Note that in FIGS. 5(a) and (b), the first insulating layer 241 and the second insulating layer 245 shown in FIG. 4 are omitted from the drawing in order to avoid unnecessary complexity. However, the data line 22 is actually disposed on the surface of these insulating layers covering the second substrate 20.

A chip connecting wiring 25 is formed on the surface of the third insulating layer 246 corresponding to each data line 22. The chip connecting wiring 25 extends from the region surrounded by the sealing material 30 to outside the sealing material 30, i.e., the projection 201. In detail, the chip connecting wiring 25 is formed on the surface of the third insulating layer 246 so as to face the portion of the data line 22 extending from the vicinity of the interior of the sealing material 30 to the projection 201, and serves to connect the data line 22 to the X driver IC 52. In this embodiment, the chip connecting wiring 25 is formed during a step for forming pixel electrodes 23; this step comprises patterning of the ITO layer covering the third insulating layer 246. Accordingly, the chip connecting wiring 25 is composed of ITO as is the pixel electrode 23.

As shown in FIGS. 5(a) and (b), each chip connecting wiring 25 is connected to the corresponding data line 22 via contact holes 25a formed in the third insulating layer 246. Moreover, the contact holes 25a of this embodiment are formed in the region surrounded by the outer edges of the sealing material 30, as shown in FIGS. 5(a) and (b). In detail, the contact holes 25a are formed in a region comprising the portion of the third insulating layer 246 facing or contacting the sealing material 30 and the portion inside the sealing material 30 facing the liquid crystal 40. This region is hereinafter referred to as the "covered region 61".

When the X driver IC 52 is mounted on the projection 201, i.e., on the third insulating layer 246 to be more precise, via an anisotropic conductive film, the conductive particles in the anisotropic conductive film connect the chip connecting wiring 25 to an output terminal 52a of the X driver IC 52. As a result, each output terminal 52a of the X driver IC 52 is electrically connected to the corresponding data line 22 via the chip connecting wiring 25, and a data signal output from the X driver IC 52 is supplied to the data line 22.

As is described above, according to this embodiment, the data lines 22 on the projection 201 are covered with the third insulating layer 246. In other words, the portions of the data lines 22 on the projection 201 as well as those surrounded by the sealing material 30 do not come into contact with the outside air; hence, corrosion of the data lines 22 caused by moisture in the outside air can be effectively prevented. Moreover, in this embodiment, each data line 22 is connected to the corresponding output terminal 52a of the X driver IC 52 via the chip connecting wiring 25. Accordingly, the entire length of the data line 22 including the portion connected to the output terminal 52a is prevented from being exposed outside, and corrosion of the data lines 22 can be securely prevented.

Each chip connecting wiring 25 of this embodiment is formed in the same step as the pixel electrodes 23; accordingly, the manufacturing cost is lower compared to the case in which the chip connecting wiring 25 and the pixel electrodes 23 are manufactured in separate steps. Furthermore, since ITO is a chemically stable oxide and is resistant to corrosion, the problem of corrosion does not occur even if a structure comprising chip connecting wiring 25 exposed to the outside air is employed, as shown in FIGS. 5(a) and (b).

Moreover, in this embodiment, the contact holes 25a for connecting the chip connecting wiring 25 to the data line 22 are formed in the covered region 61 to securely prevent corrosion of the data lines 22. The details are described below.

Figure 6:
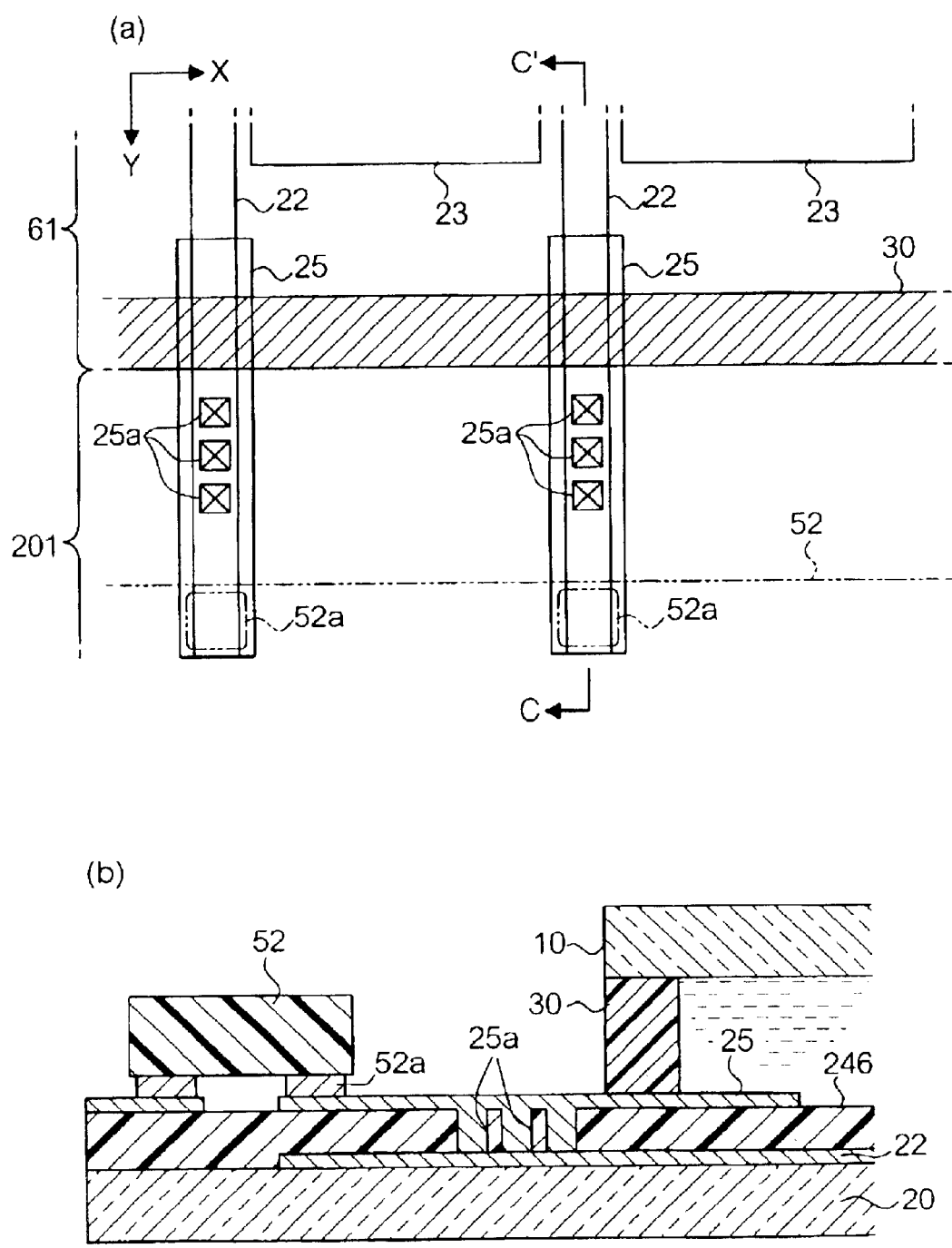
FIG. 6(a) is a plan view showing the structure of a comparative example for the liquid crystal display, and (b) is a cross-sectional view taken along line C-C' in (a).

FIGS. 6(a) and (b) show a comparative example in which the contact holes 25a are formed in the region other than the covered region 61, i.e., the region outside the sealing material 30. In this structure, since the major parts of the data line 22 are covered with the third insulating layer 246 excluding the portion at the contact holes 25a, the corrosion of the data lines 22 is less significant compared to the case where no third insulating layer 246 is provided and data lines 22 are exposed at the projection 201. However, ITO constituting the chip connecting wiring 25 readily allows moisture to permeate. Thus, the moisture contained in the outside air reaches the data lines 22 through the contact holes 25a, thereby corroding the data lines 22.

In contrast, the contact holes 25a of this embodiment are formed inside the covered region 61 covered with the sealing material 30 and the liquid crystal 40. The chip connecting wiring 25 in the vicinity of the contact holes 25a does not come in contact with the outside air. Thus, moisture is prevented from reaching the data line 22 through the contact holes 25a. In other words, according to this embodiment, the corrosion of the data lines 22 can be securely avoided compared with the case shown in FIGS. 6(a) and (b).

<B: Second Embodiment>

Next, a second embodiment of the present invention is described. A liquid crystal display of this embodiment has the same structure as that of the liquid crystal display 1 of the first embodiment except for the configuration of the vicinity of the projection 201. In the description below, only the structure of the vicinity of the projection 201 is described according to this embodiment, and descriptions of other components are omitted.

Figure 7:
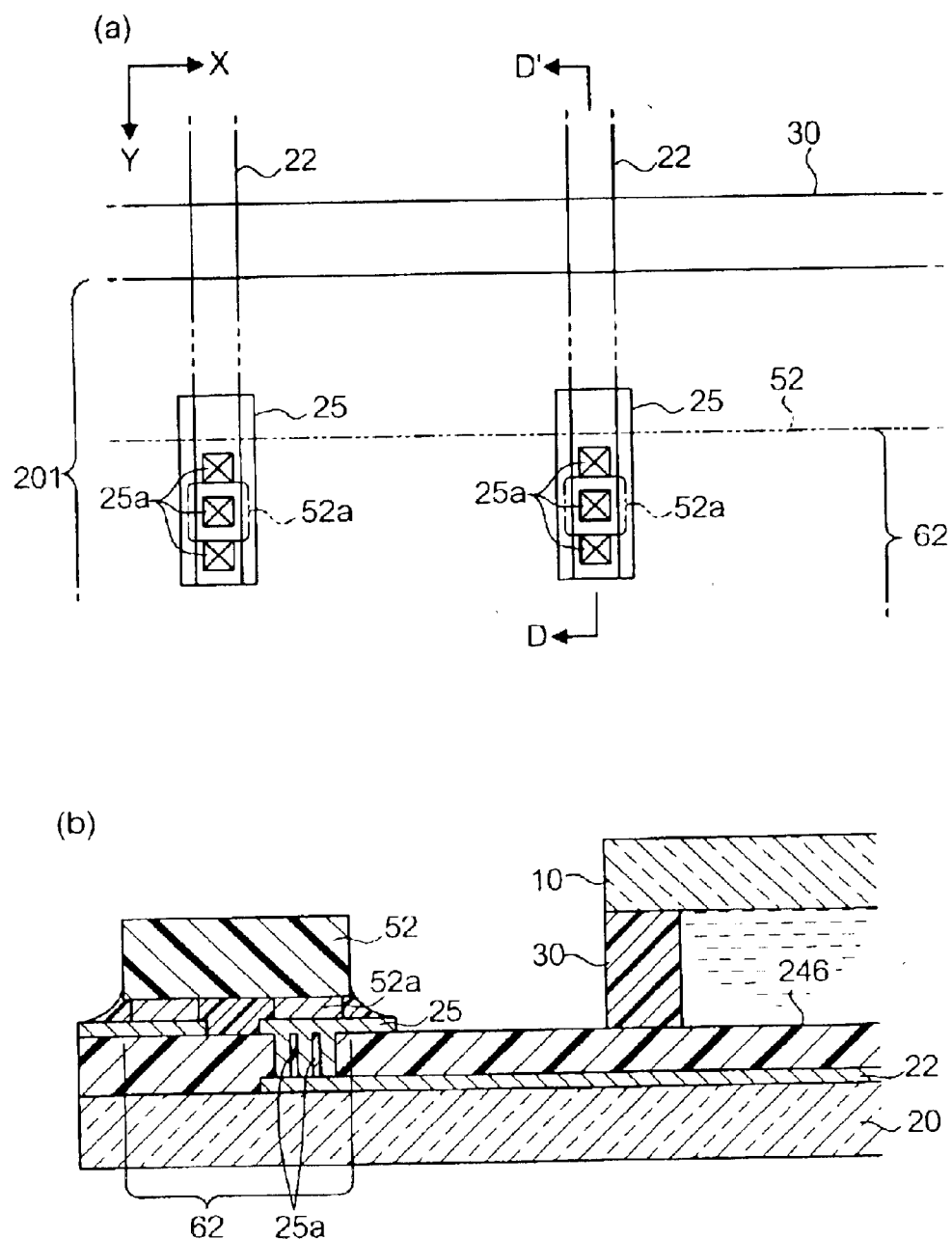
FIG. 7(a) is a plan view showing the structure of the vicinity of a projection in a liquid crystal display according to a second embodiment of the present invention and (b) is a cross-sectional view taken along line D-D' in (a).

FIG. 7(a) is a plan view showing the structure of the vicinity of the projection 201 of the liquid crystal display of this embodiment. FIG. 7(b) is a cross-sectional view taken along line D-D' in FIG. 7(a). As shown in these drawings, the liquid crystal display of this embodiment is similar to the liquid crystal display 1 of the first embodiment in that each data line 22 extends in the Y direction from the region surrounded by the sealing material 30 onto the projection 201 and that the major portion of each data line 22 is covered with the third insulating layer 246. The difference lies in the state of connection between the data line 22 and the output terminal 52a of the X driver IC 52.

To be more specific, as shown in FIGS. 7(a) and (b), each chip connecting wiring 25 of this embodiment covers the regions of the third insulating layer 246 at which the output terminals 52a of the X driver IC 52 are formed and the vicinities of such regions. The chip connecting wiring 25 is connected to the output terminal 52a of the X driver IC 52 when the X driver IC 52 is mounted. Each data line 22 has an end thereof reaching a position in the projection 201 corresponding to the output terminal 52a of the X driver IC 52. In other words, the end portion of the data line 22 disposed on the projection 201 faces the chip connecting wiring 25 with the third insulating layer 246 therebetween.

In this structure, the chip connecting wiring 25 is electrically connected to the corresponding data line 22 via the contact holes 25a formed in the third insulating layer 246. In this embodiment, the contact holes 25a are disposed inside a region 62 of the third insulating layer 246 at which the X driver IC 52 is mounted, i.e., the region covered by the X driver IC 52. This region is hereinafter referred to as the "mounting region 62". A resin or mold seals the connecting portion between the X driver IC 52 and the chip connecting wiring 25.

In this embodiment, as in the first embodiment, the data lines 22 are covered with the third insulating layer 246 to prevent corrosion of the data lines 22. Since the chip connecting wiring 25 and the pixel electrodes 23 can be manufactured in the same step, the manufacturing cost can be reduced. Moreover, according to this embodiment, the contact holes 25a for connecting the chip connecting wiring 25 to the data line 22 are disposed inside the mounting region 62 for mounting the X driver IC 52, and a resin seals the connecting portion between the output terminal 52a of the X driver IC 52 and the chip connecting wiring 25. Thus, even when the chip connecting wiring 25 is made of a material which readily permeates moisture, for example, ITO, moisture is inhibited from reaching the data lines 22 through the contact holes 25a and corrosion of the data lines 22 can be reliably prevented.

<C: Modification>

The above descriptions on embodiments are for the illustrative purpose only and various modifications may be imparted to these embodiments without departing from the scope of the present invention. Examples of the modifications are as follows.

(1) The first embodiment illustrates a structure having the contact holes 25a disposed inside the covered region 61. The second embodiment illustrates a structure having the contact holes 25a disposed inside the mounting region 62. However, both of these structures can be employed. In particular, while forming each chip connecting wiring 25, which extends to the vicinity of the output terminal 52a of the X driver IC 52 from the interior of the sealing material 30, on the third insulating layer 246 so as to face the corresponding data line 22, the chip connecting wiring 25 may be connected to the data line 22 via the contact holes 25a formed in both the covered region 61 facing the sealing material 30 and the liquid crystal 40 and the mounting region 62 for the X driver IC 52 of the third insulating layer 246.

Moreover, in the first embodiment, the contact holes 25a are formed in the two regions of the third insulating layer 246, one facing the sealing material 30 and the other facing the liquid crystal 40. However, the contact holes 25a may be formed in only one of the two regions. The point is to form the contact holes 25a in the covered region, i.e., a first region, including a region facing the liquid crystal 40 so as to achieve a structure capable of preventing moisture in the outside air from reaching the vicinity of the contact holes 25a.

(2) Each of the above-described embodiments illustrates a structure having the X driver IC 52 which is mounted on the projection 201 by the COG method. Alternatively, a flexible substrate having an X driver IC mounted thereon may be mounted on the projection 201. In particular, a flexible substrate comprising a film base having an X driver IC mounted thereon and wiring formed on the surface of the film base is bonded to the projection 201 through an anisotropic conductive layer. The conductive particles in the anisotropic conductive layer then electrically connect the wiring of the flexible substrate to the chip connecting wiring 25 on the projection 201. When the flexible substrate is mounted instead of the X driver IC 52 in the structure illustrated in the second embodiment, the region of the third insulating layer 246 bonded to the flexible substrate (more specifically, the region covered with the film base) is defined as the "mounting region". Accordingly, the contact holes 25a formed in this mounting region to connect the chip connecting wiring 25 to the data line 22 prevents moisture in the outside air from reaching the vicinity of the contact holes 25a due to the film base, achieving the same advantages as in the above-described second embodiment. In view of the above, the "electronic component" in these embodiments is not limited to a driver IC but includes various components having electrodes or wiring to be connected to the chip connecting wiring 25.

(3) In the first embodiment, each data line 22 extends over the projection 201. However, since the data line 22 and the chip connecting wiring 25 are connected to each other at the covered region 61, the data lines 22 need not extend over the projection 201. Moreover, although only the data lines 22 are connected to the output terminals 52a of the Y driver IC 52 through the chip connecting wiring 25 in the above-described embodiments and modifications, the same arrangement may naturally be employed for the scanning lines 21.

(4) In each of the above-described embodiments, the data lines 22 are made of aluminum and the chip connecting wiring 25 are made of ITO. However, this does not limit the material of these wiring. From the point of view of preventing corrosion of the data lines 22, the material for the chip connecting wiring 25 is preferably chemically more stable, i.e., more corrosion-resistant, than that for the data lines 22. For example, while the data lines 22 may be made of an elemental metal such as silver, copper, or chromium, or of an alloy containing these metals, the chip connecting wiring 25 may be made of $SnO_2$, gold, platinum, or the like, which is chemically more stable than the data lines 22. Although the chip connecting wiring 25 and the pixel electrodes 23 are formed in the same step in the above-described embodiments, they may be formed in separate steps.

(5) In the above embodiments, an active matrix liquid crystal display using TFTs as the three-terminal switching elements is illustrated. However, the present invention is applicable to an active matrix liquid crystal display using two-terminal switching elements such as thin film diodes (TFDs) or to a passive matrix liquid crystal display, which has no switching elements.

In the above-described embodiments, the present invention is applied to a liquid crystal display using liquid crystal as the electro-optical material. However, the present invention is applicable to various other devices which display images by an electro-optical effect using electroluminescent elements, such as organic electroluminescent elements, as the electro-optical material. The present invention is applicable to various other electro-optical devices as long as they have wiring on the substrate and the wiring are connected to the terminals of an electronic component.

<D: Electronic Apparatus>

Next, electronic apparatuses incorporating the electro-optical device of the preset invention are described.

(1) Mobile computer

Figure 8:
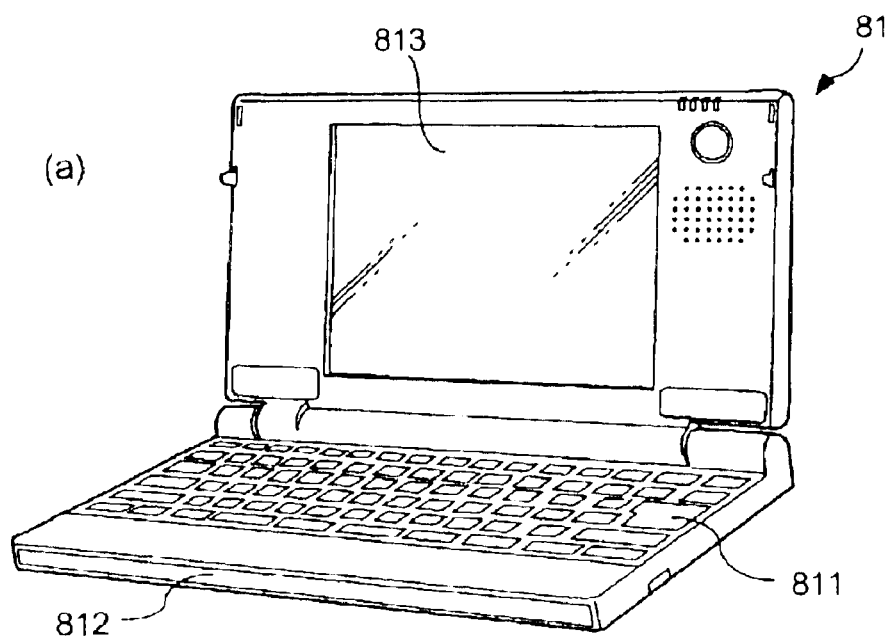
FIG. 8(a) is a perspective view showing the structure of a personal computer which is an example of an electronic apparatus incorporating the electro-optical device of the present invention, and (b) is a perspective view showing the structure of a cellular phone which is another example of an electronic apparatus incorporating the electro-optical device of the present invention.
Figure 8:
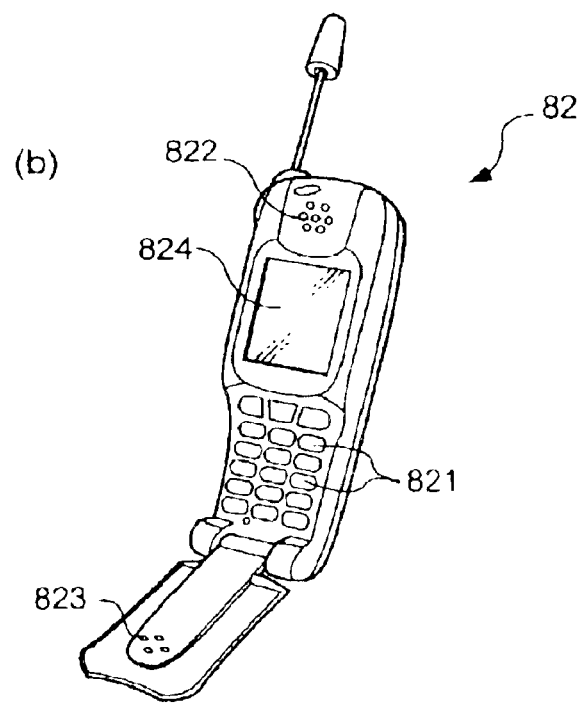

A portable personal computer, i.e., a so-called notebook computer, having a display unit incorporating the electro-optical device of the present invention is now explained. FIG. 8(a) is a perspective view showing the structure of this personal computer. As shown in the drawing, a personal computer 81 comprises: a main unit 812 including a keyboard 811; and a display unit 813 incorporating the electro-optical device of the present invention.

(2) Cellular phone

A cellular phone having a display unit incorporating the electro-optical device of the present invention is now explained. FIG. 8(b) is a perspective view showing the structure of this cellular phone. As shown in the drawing, a cellular phone 82 comprises a plurality of operation buttons 821, an earpiece 822, a mouthpiece 823, and a display unit 824 incorporating the electro-optical device of the present invention.

Examples of electronic apparatuses capable of incorporating the electro-optical devices of the present invention other than the personal computer and the cellular phone shown in FIGS. 8(a) and (b) are liquid crystal televisions, viewfinder- or direct-view-type video recorders, car navigation systems, pagers, electronic databooks, calculators, word processors, work stations, video telephones, POS terminals, digital still cameras, and projectors using the electro-optical device of the present invention as the light valves. As is previously described, in the electro-optical device of the present invention, corrosion of the wiring on the substrate can be inhibited to ensure reliability in the performance of the electronic device incorporating the electro-optical device.

As is described above, the present invention suppresses corrosion of the wiring formed on the substrate.

What is claimed is:

1. An electro-optical device, comprising:
an electro-optical material;
a substrate that supports the electro-optical material;
a first wiring formed over a surface of the substrate;
an insulating layer that covers the first wiring, the insulating layer being formed over the surface of the substrate; and
a second wiring formed over a first region of the insulating layer that includes a region overlapping a region in which the electro-optical material is formed, and a second region which corresponds to a remaining region other than the first region of the insulating layer, the second wiring being connected to the first wiring via a plurality of contact holes formed within the first region of the insulating layer, wherein
the insulating layer further includes a mounting region overlaid with an electronic component mounted on the surface of the insulating layer, and the second wiring is connected to the first wiring via a contact hole formed in the mounting region of the insulating layer.

2. The electro-optical device according to claim 1, further including a counter substrate, the electro-optical material being sandwiched between the substrate and the counter substrate, a sealing material being disposed between the substrate and the counter substrate,
the first region including a region of the insulating layer which faces the sealing material.

3. The electro-optical device according to claim 1, the electronic component being an integrated circuit that includes an output terminal connected to the second wiring.

4. The electro-optical device according to claim 1, the electronic component being a flexible substrate that includes a base having flexibility and a wiring formed on the surface of the base, the wiring being connected to the second wiring.

5. The electro-optical device according to claim 1, the first wiring including at least one of an elemental metal and an alloy, and the second wiring including a conductive oxide.

6. The electro-optical device according to claim 1, further including a pixel electrode that applies a voltage to the electro-optical material, the second wiring and the pixel electrode being formed of the same layer.

7. An electronic apparatus, comprising:
the electro-optical device according to claim 1.

8. The electro-optical device according to claim 1, wherein the plurality of contact holes are formed in a line over the first wiring.

9. The electro-optical device according to claim 1, wherein a part of the first wiring is formed overlaid with an electronic component.

10. The electro-optical device according to claim 1, further including a counter substrate and a sealing material between the substrate and the counter substrate, wherein at least one of the plurality of contact holes is formed at a region which faces the sealing material.

11. The electro-optical device according to claim 1, wherein the first wiring is a scanning line.

* * * * *